Dec. 8, 1970   J. TURECEK   3,546,587
CAPACITIVE SENSING PORTABLE HIGH VOLTAGE DETECTING APPARATUS
WITH MEANS FOR CHECKING OPERABILITY OF THE
DETECTING APPARATUS
Filed April 25, 1968   2 Sheets-Sheet 1

INVENTOR.
Jan Tureček
BY

INVENTOR.
Jan Tureček

United States Patent Office 3,546,587
Patented Dec. 8, 1970

3,546,587
CAPACITIVE SENSING PORTABLE HIGH VOLTAGE DETECTING APPARATUS WITH MEANS FOR CHECKING OPERABILITY OF THE DETECTING APPARATUS
Jan Tureček, Bratislava, Czechoslovakia, assignor to Tesla, narodni podnik, Prague, Czechoslovakia
Filed Apr. 25, 1968, Ser. No. 724,161
Claims priority, application Czechoslovakia, May 24, 1967, 3,761/67
Int. Cl. G01r 19/16
U.S. Cl. 324—133
4 Claims

ABSTRACT OF THE DISCLOSURE

A capacitive sensing device of portable high voltage detecting apparatus produces an electrical signal upon detecting electric or electromagnetic fields. The signal is amplified, rectified, converted into an audio frequency signal and then radiated as an audible alarm signal. A manually operable switch connects a source of DC voltage to an amplifier which amplifies the signal. A circuit for testing the apparatus for operability comprising a manually operable switch connecting the DC voltage source to the input of the amplifier.

DESCRIPTION OF THE INVENTION

Figure 1:
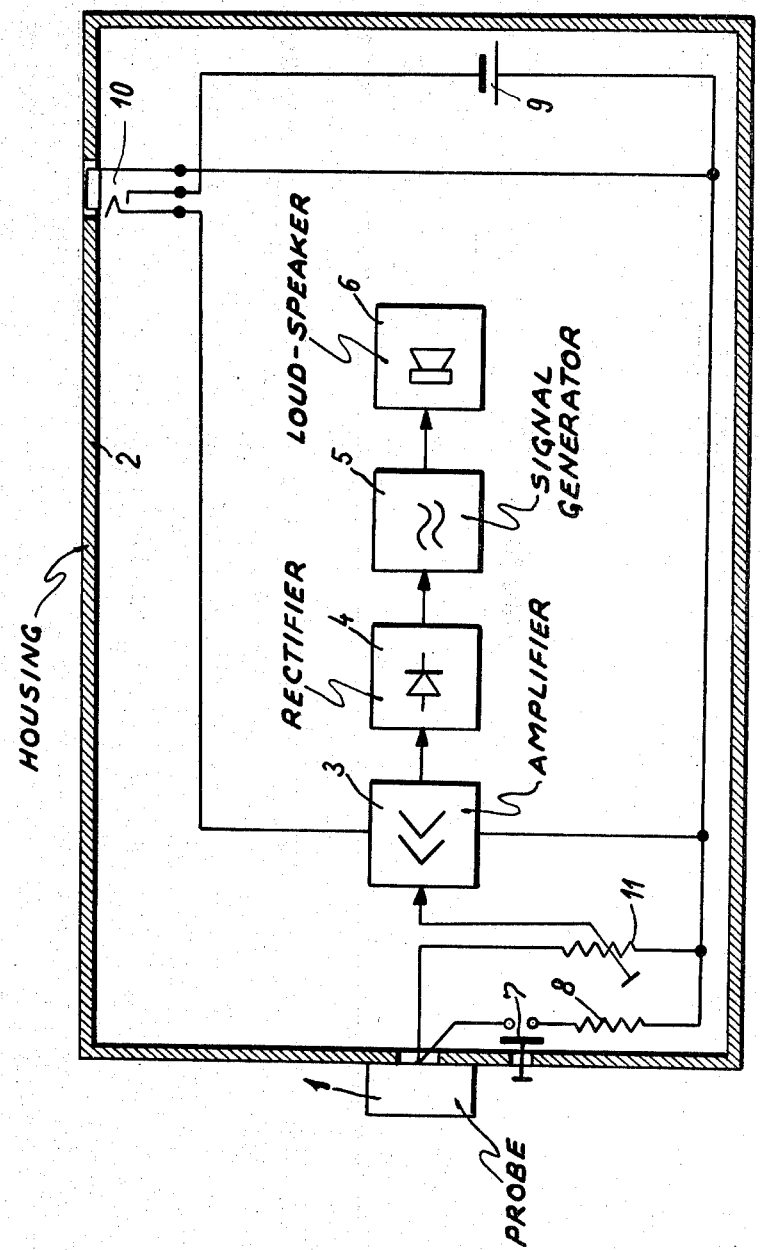

The present invention relates to voltage detecting apparatus. More particularly, the invention relates to portable high voltage detecting apparatus.

Most accidents caused by high voltage electricity result from the failure of the victim or others to observe applicable safety regulations. Sometimes, although applicable safety regulations are observed, accidents occur due to the failure to test for voltage during the course of the work and/or due to error at a different work place or control point. A worker may also be killed or injured because he may mistake a live component or transmission line for a dead one.

During electrical work, voltage detecting apparatus is utilized by being mounted on poles. The apparatus either uses electrically conductive leads or not and provides either visual or audible alarm indications. Before the work commences, the voltage detecting apparatus is utilized to test high voltage components for the presence of high voltage. The detecting apparatus is not used again for high voltage testing during the course of the work. Thus, a newly developed high voltage is undetected. Furthermore, sunlight may make it very difficult to see a visual alarm, so that a high voltage which occurs after completion of the initial testing may be undetected.

A common type of audible alarm high voltage detecting apparatus utilizes a copper cylinder mounted on a pole as a probe. The probe is positioned in a casing or housing of electrical insulating material with other components of the apparatus such as, for example, an amplifier, a signal generator, a dry cell or battery and a loudspeaker. This high voltage detecting apparatus is worthless in the event that a high voltage arises during the course of the work, since it is not utilized except before the commencement of work. Furthermore, this apparatus has insufficient sensitivity and is dependent upon working conditions and the user, so that it does not insure protection of such user.

Apparatus is utilized for detecting faults in power lines. The fault detecting apparatus detects and locates open or broken conductors or lines, short-circuited lines and faulty insulation. The fault detecting apparatus is either electrically connected to or placed in electrical proximity with the tested lines and utilizes an inductive or capacitive probe, which is appropriately insulated, to permit the user to maintain a safe distance from the tested lines during testing. The inductive or capacitive probe of the apparatus is connected to the input of an amplifier and an earphone is transformer-coupled to the output of the amplifier. Although such apparatus detects and locates faults satisfactorily, it does not provide adequate protection for people working near high voltage or high current equipment, since it is dependent in operation upon current flow and does not indicate reactivated equipment or newly developed high voltage.

Portable high voltage detecting apparatus may be utilized to protect workers installing high voltage or high current systems or equipment. The apparatus may be grounded or ungrounded and comprises a capacitive probe in an electrical insulating housing or casing. The probe is at an opening through the housing which is covered by a protective lid. The capacitive probe is connected to a multistage amplifier which has an output connected to a relay or flip flop circuit. The relay or flip flop controls a source of audible signals which are provided at earphones. The apparatus does not have sufficient sensitivity due to the earphones. Furthermore, it is inconvenient for the workers to wear earphones and the earphones make it difficult for them to hear each other. If the user removes his earphones, he cannot hear the audible signals, since they are too weak to be heard at a distance. Another shortcoming of the apparatus is the necessity for maintaining the battery or power permanently connected in the circuit.

High voltage detecting apparatus must provide adequate protection for people working with high voltage or high current equipment by warning, with an adequate, readily-perceived signal, of high voltage or high current in the equipment, newly developed in the equipment, or reactivating the equipment. The apparatus and thus its probe, must be highly sensitive to both electric and electromagnetic fields.

The principal object of the present invention is to provide new and improved high voltage detecting apparatus.

An object of the present invention is to provide and improved portable high voltage detecting apparatus.

An object of the present invention is to provide portable high voltage detecting apparatus which overcomes the disadvantages of known apparatus.

An object of the present invention is to provide portable high voltage detecting apparatus which provides an adequate, readily-perceived signal warning of high voltage or high current in equipment, including high voltage newly developed in the equipment and high voltage reactivating the equipment.

An object of the present invention is to provide portable high voltage detecting apparatus which functions with efficiency, effectiveness and reliability to warn of high voltage or current.

An object of the present invention is to provide portable high voltage detecting apparatus which is lightweight, compact and small in volume and may be carried in a pocket or strapped to the wrist of the user.

An object of the present invention is to provide portable high voltage detecting apparatus which is devoid of external leads and earphones and is convenient, easy and light to handle.

An object of the present invention is to provide portable high voltage detecting apparatus which indicates with an audible signal a high voltage or a high voltage newly developed in equipment, as soon as the apparatus reaches a safe distance from the equipment, whether such apparatus is carried by someone or placed at a convenient location.

An object of the present invention is to provide portable high voltage detecting apparatus which functions independently of the user.

An object of the present invention is to provide portable high voltage detecting apparatus of which a plurality may be positioned around equipment to pinpoint the location and direction of high voltage in the equipment.

Another object of the present invention is to provide portable high voltage detecting apparatus which warns of high voltage or high current with great efficiency and reliability when positioned closer than a safe distance to electrical equipment.

In accordance with the present invention, portable high voltage detecting apparatus comprises a housing. A capacitive sensing device on the outside of the housing senses electric and electromagnetic fields and produces an electrical signal upon detecting the fields. An amplifier in the housing connected to the sensing device amplifies an electrical signal produced by the sensing device. A rectifier in the housing connected to the amplifier rectifies the amplified electrical signal. A signal generator in the housing connected to the rectifier produces an audio signal. A source of audible signals in the housing connected to the signal generator radiates an audible signal. Connections including a manually operable switch electrically connects a source of electrical energy in the housing to the amplifier. A circuit in the housing tests the apparatus for operability. The circuit comprises a manually operable switch and electrically conductive connectors connecting the source of electrical energy to the input of the amplifier through the switch.

The sensing device comprises a metal strip. The signal generator comprises a bistable multivibrator. The source of audible signals comprises a loudspeaker. The source of electrical energy comprises a source of D.C. voltage. The switch of the circuit is a push button switch. A potentiometer is connected between the sensing device and the amplifier for adjusting the sensitivity of response of the apparatus.

Figure 2:
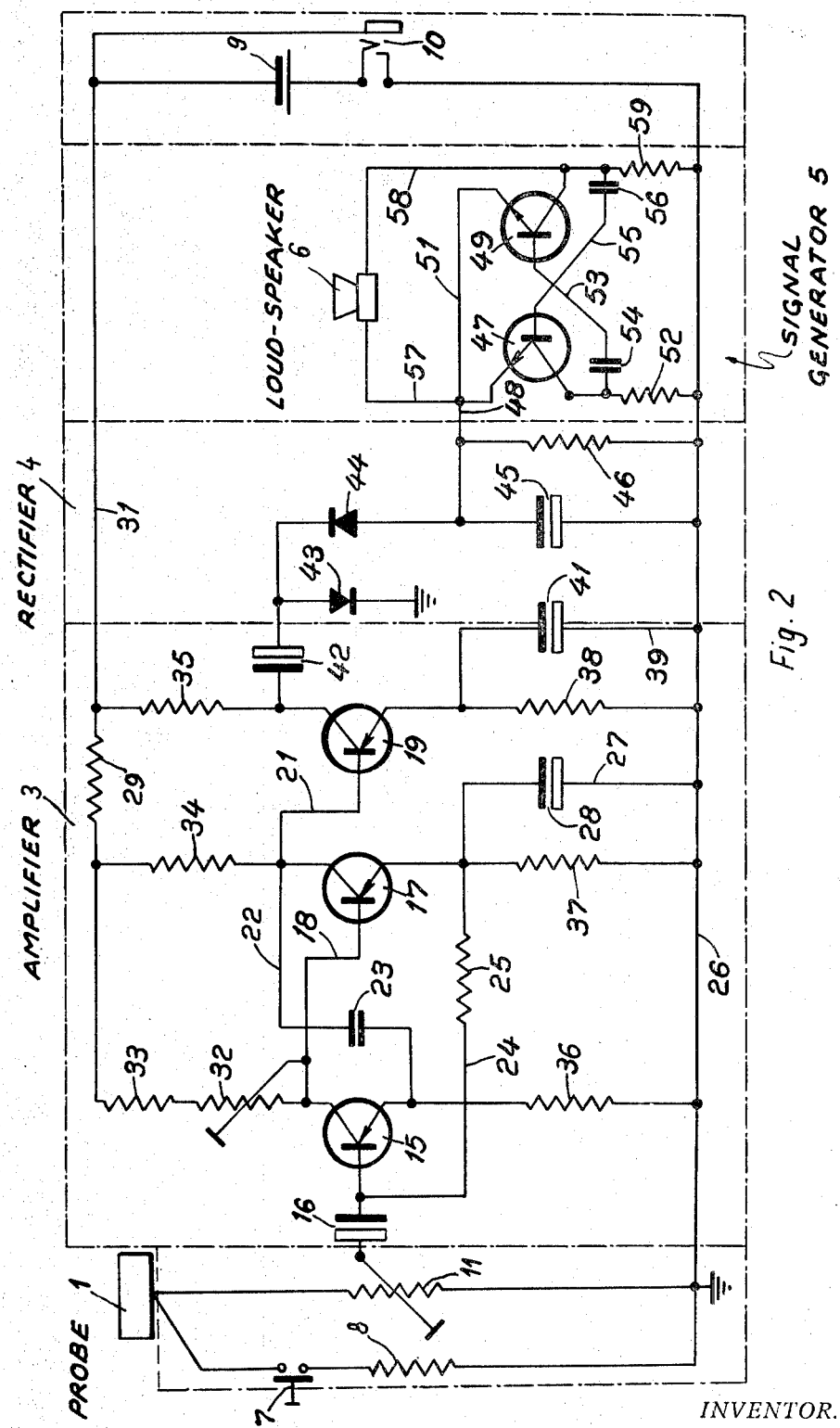

In order that the present invention may be readily carried into effect, it will now be described with reference to the accompanying drawings, wherein:

FIG. 1 is a block diagram of an embodiment of the high voltage detecting apparatus of the present invention; and FIG. 2 is a circuit diagram of the embodiment of FIG. 1.

In the figures, the same components are identified by the same reference numerals.

In FIG. 1, a probe or sensing element 1 comprises a metal strip on a housing or casing 2. The housing 2 houses all the components of the high voltage detecting apparatus of the present invention. The probe 1 is connected to the input of an amplifier 3. The output of the amplifier 3 is connected to the input of a rectifier 4. The output of the rectifier 4 is connected to the input of a signal generator 5. The output of the signal generator 5 is connected to a loudspeaker 6.

Each of the components 1, 3, 4, 5, and 6 of the high voltage detecting apparatus of the present invention may comprise any suitable known equipment for performing the function ascribed to it.

A push button switch 7 and a resistor 8 are connected in series between the probe 1 and a battery or other suitable source of electrical energy 9. The battery 9 is connected to the amplifier 3 via a switch 10 and a potentiometer 11. The push button switch 7 is accessible from outside the housing 2 and is depressed by the user in order to determine if the apparatus is in operable condition. The switch 10 is also accessible from outside the housing 2 and is depressed by the user in order to operate the apparatus. The potentiometer or variable resistor 11 is utilized to adjust or vary the selectivity or sensivity of the apparatus. Although the sensitivity or selectivity of the apparatus is adjusted by adjustment of the potentiometer 11 in the factory, working conditions may require its readjustment on the job.

In FIG. 2 the amplifier 3 comprises a three stage, resistance-coupled, grounded emitter transistor circuit. The variable contact of the potentiometer 11 is connected to the base electrode of a first transistor 15 via a coupling capacitor 16. The collector electrode of the first transistor 15 is connected to the base electrode of a second transistor 17 via a lead 18.

In the amplifier 3, the collector electrode of the second transistor 17 is connected to the base electrode of a third transistor 19 via a lead 21 and to the emitter electrode of the first transistor 15 via a lead 22 and a capacitor 23 connected in the lead 22. The base electrode of the first transistor 15 is connected to the emitter electrode of the second transistor 17 via a lead 24 and a resistor 25 connected in said lead, and said emitter electrode is connected to a ground lead 26 via a lead 27 and a capacitor 28 connected in the lead 27.

A resistor 29 is connected in the positive lead 31 from the battery 9. The collector electrode of the first transistor 15 is connected to the positive lead 31 via series-connected variable resistor 32 and resistor 33. The collector electrode of the second transistor 17 is connected to the positive lead 31 via a resistor 34 and the collector electrode of the third transistor 19 is connected to said lead via a resistor 35.

The emitter electrode of the first transistor 15 is connected to the ground lead 26 via a resistor 36 and the emitter electrode of the second transistor 17 is connected to said ground lead via a resistor 37. The emitter electrode of the third transistor 19 is connected to the ground lead 26 via a resistor 38 and via a lead 39 and a capacitor 41 connected in the lead 39. The collector electrode of the third transistor 19 is connected to the input of the rectifier 4 via a coupling capacitor 42.

The rectifier 4 comprises a pair of diode rectifiers 43 and 44. The input of the rectifier 4 is connected to the anode of the diode 43 and the cathode of the diode 44. The output of the rectifier 4 is connected to the anode of the diode 44. A filter connects the output of the rectifier 4 to the input of the signal generator 5, which comprises a bistable multivibrator or flip flop. The filter comprises a capacitor 45 and a resistor 46.

The flip flop 5 comprises a first transistor 47 having an emitter electrode connected to the output of the filter 45, 46 via a lead 48 and to the emitter electrode of a second transistor 49 via a lead 51. The collector electrode of the first transistor 47 is connected to the ground lead 26 via a resistor 52 and to the base electrode of the second transistor 49 via a lead 53 and a capacitor 54 connected in the lead 53. The base electrode of the first transistor 47 is connected to the collector electrode of the second transistor 49 via a lead 55 and a capacitor 56 connected in said lead.

The leads 51 and 48 are connected to the input of the loudspeaker 6 via a lead 57. The capacitor 56 and the collector electrode of the second transistor 49 are connected to the input of the loudspeaker 6 via a lead 58. The loudspeaker 6 is connected to the ground lead 26 via a resistor 59 connected in the lead 58. The loudspeaker 6 may comprise a tone frequency generator, or the like, and/or a minature loudspeaker. Although the battery 9 is connected to the amplifier 3 when the switch 10 is closed, or ON, the rectifier 4, the signal generator 5 and the loudspeaker 6 are connected to said battery only when the probe 1 indicates the presence of a high voltage in the area.

When the high voltage detecting apparatus of the present invention is to be utilized, it may be tested for operability by closing the switch 7 to its ON condition. The switch 10 is also closed to its ON condition. This replaces the probe 1 with the battery 9, which then replaces said probe with a simulated alarm voltage which produces an audible signal at the loudspeaker 6.

When the apparatus is utilized, the switch 10 is closed to its ON condition. The switch 7 remains in its open or OFF condition. When the probe 1 senses or detects a high voltage or high current in the area, by detecting the electric or electromagnetic field produced by said high voltage or high current, said probe produces an alarm voltage. The alarm voltage is amplified by the amplifier 3, rectified by the rectifier 4 and energizes the signal generator 5 to produce an audio frequency signal.

The audio frequency signal is amplified by the loudspeaker 6, which then radiates said signal as an audible alarm signal which is loud enough to be heard at a distance from said loudspeaker. The probe 1 detects the presence of a high voltage or current as soon as the apparatus is closer than a safe distance from said high voltage or current. The probe 1 is preferably a capacitive sensing component.

While the invention has been described by means of a specific example and in a specific embodiment, I do not wish to be limited thereto, for obvious modifications will occur to those skilled in the art without departing from the spirit and scope of the invention.

What I claim is:
1. A portable high voltage detecting apparatus comprising
   a housing;
   a capacitive sensing device comprising a flat metallic member mounted on the outside of said housing for sensing electric and electromagnetic fields, said sensing device producing an electrical signal upon detecting said fields;
   a source of DC voltage;
   an amplifier in said housing having an output and an input said input connected to said sensing device for amplifying an electrical signal produced by said sensing device;
   a potentiometer means connected between said sensing device and the input of said amplifier and said source for adjusting the sensitivity of response of said apparatus;
   a rectifier in said housing having an output and an input said input being connected to the output of said amplifier for rectifying the amplified electrical signal;
   a signal generator in said housing having an output and an input said input connected to the output of said rectifier for producing an audio frequency signal;
   a source of audible signals in said housing connected to the output of said signal generator for radiating an audible signal;
   connecting means having first manually operable switch means accessible from the outside of said housing for electrically connecting said source of electrical energy to said amplifier; and
   circuit means in said housing for testing said apparatus for operability, said circuit means comprising second manually operable switch means accessible from outside of said housing and electrically conductive connecting means connecting said source of electrical energy to the input of said amplifier through said second switch means.

2. Apparatus as claimed in claim 1, wherein said sensing device comprises a metal strip on the outside of said housing.

3. Apparatus as claimed in claim 1, wherein said signal generator comprises a bistable multivibrator.

4. Apparatus as claimed in claim 1, wherein said source of audible signals comprises a loudspeaker.

References Cited
UNITED STATES PATENTS

| | | | |
|---|---|---|---|
| 2,942,189 | 6/1960 | Shea et al. | 324—133 |
| 3,009,099 | 11/1961 | Muller | 324—52 |
| 3,029,383 | 4/1962 | Douglas et al. | 324—133X |
| 3,204,183 | 8/1965 | Hasenzahl | 324—133 |
| 3,309,690 | 3/1967 | Moffit | 324—133X |

GERALD R. STRECKER, Primary Examiner

U.S. Cl. X.R.
324—72